(12) United States Patent
Gao et al.

(10) Patent No.: US 11,059,534 B2
(45) Date of Patent: Jul. 13, 2021

(54) NONDETERMINISTIC ASSEMBLY SYSTEM AND METHOD

(71) Applicant: GM GLOBAL TECHNOLOGY OPERATIONS LLC, Detroit, MI (US)

(72) Inventors: Dalong Gao, Rochester, MI (US); Ningjian Huang, Bingham Farms, MI (US); Richard C. Janis, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 16/223,218

(22) Filed: Dec. 18, 2018

(65) Prior Publication Data

US 2020/0189675 A1    Jun. 18, 2020

(51) Int. Cl.
  *B62D 65/02*   (2006.01)
  *B23P 19/04*   (2006.01)

(52) U.S. Cl.
  CPC ............ *B62D 65/024* (2013.01); *B23P 19/04* (2013.01)

(58) Field of Classification Search
  CPC .... B62D 65/024; B23P 19/04; B23P 2700/50; B23P 21/004; B23P 21/008; B23K 11/115; B23K 37/047; B23K 2101/006; B23K 2101/18; B25J 5/00; B25J 9/162; B25J 9/00; B25J 5/007; B25J 5/02; B25J 9/0009; Y10T 29/49828; Y10T 29/49829
  See application file for complete search history.

(56) References Cited

U.S. PATENT DOCUMENTS

| | | | | |
|---|---|---|---|---|
| 4,926,544 A | * | 5/1990 | Koyanagi | B25J 5/007 29/703 |
| 5,526,357 A | * | 6/1996 | Jandrell | G01S 5/0009 340/991 |
| 5,983,198 A | * | 11/1999 | Mowery | G06Q 10/08 705/22 |
| 6,484,079 B2 | * | 11/2002 | Buckelew | B28C 5/422 340/439 |
| 7,212,876 B2 | | 5/2007 | Blumenfeld et al. | |

(Continued)

OTHER PUBLICATIONS

U.S. Appl. No. 16/124,329, titled "Real-time Formed Robotic Swarm for Material Handling," filed Sep. 7, 2018 by GM Global Technology Operations LLC.

*Primary Examiner* — Lawrence Averick

(57) ABSTRACT

A method of assembling a manufactured item without a guide rail and an assembly system are provided. The method includes disposing a base item on an unmanned independent vehicle system, moving the unmanned independent vehicle system to an assembly station, and attaching an additional item to the base item. The assembly system includes a number of unmanned independent vehicle systems, each unmanned independent vehicle system having at least one wheel. Each unmanned independent vehicle system is configured to be loaded with a base item. A number of assembly stations are provided, each being configured to complete at least one assembly operation. Each unmanned independent vehicle system is configured to independently move to multiple of the assembly stations to have a different assembly operation performed at each assembly station, resulting in additional items being attached to each base item to form each manufactured item.

11 Claims, 3 Drawing Sheets

(56) References Cited

U.S. PATENT DOCUMENTS

| | | | |
|---|---|---|---|
| 7,554,440 B2* | 6/2009 | Kadaba | G01N 33/0075 340/539.22 |
| 7,617,017 B2 | 11/2009 | Menassa et al. | |
| 8,236,037 B2 | 8/2012 | Rober et al. | |
| 8,700,205 B2 | 4/2014 | Scheuerman et al. | |
| 8,738,180 B2 | 5/2014 | Shi et al. | |
| 9,095,978 B2 | 8/2015 | Shi et al. | |
| 2008/0024323 A1* | 1/2008 | Kadaba | G01N 33/0075 340/905 |
| 2010/0202368 A1* | 8/2010 | Hans | H04L 65/602 370/329 |
| 2010/0301099 A1* | 12/2010 | Sata | B23P 21/004 228/6.1 |
| 2013/0226341 A1* | 8/2013 | Sturm | B25J 5/007 700/245 |
| 2018/0339456 A1* | 11/2018 | Czinger | B33Y 10/00 |
| 2019/0197472 A1* | 6/2019 | Matsuoka | G06Q 10/0834 |
| 2020/0410855 A1* | 12/2020 | Zalila-Wenkstern | G08G 1/08 |

\* cited by examiner

NONDETERMINISTIC ASSEMBLY SYSTEM AND METHOD

INTRODUCTION

The present disclosure relates to assembly systems and methods within a manufacturing plant, and more particularly to assembly systems that may have variable cycle times within an overall assembly process.

A typical automotive manufacturing plant may include moving, partially assembled manufactured items that move along a guide rail through many assembly stations along a predetermined path. Assembly operations at each station can only be performed for a predetermined cycle time, since operation of the entire system is interconnected. For example, in an assembly station that includes a welding operation, a robot may perform a number of spot welds to assemble parts together and stop performing the spot welds at the end of the predetermined cycle time. Then, if additional weld joints are needed to adequately secure the parts together, the part needs to go through another welding cycle having the same predetermined cycle time. The second welding operation may be finished before the cycle time is over, but due to the interconnectedness of the assembly system, the part may then need to wait until the next cycle to move on to the next assembly station. This results inefficiencies, such as less throughput and added wait time.

SUMMARY

The present disclosure provides a new nondeterministic system and method that meets production throughput requirements with potentially lower system capital investment. It includes a new process and layout that does not set fixed cycle time for each operation, including loading and joining/assembling, and a new intelligent material delivery system applied to match the need of a variable transit schedule. In some variations, unmanned automated vehicles are used instead of traditional welding turntables to move parts to and from welding stations (or other assembly stations). The unmanned automated vehicles move parts from one independent station to another to be further added to or built upon. As the unmanned automated vehicles are decoupled from the assembly stations themselves, loading is no longer required to occur at the assembly station; instead, loading may be placed in another location, such as near part containers. Separating the loading station from the working stations in a decoupled layout enables flexible operations, which enhances efficiency. When multiple styles are processed, the sequence (or batch) may be monitored to maintain desired style penetration ratios. The system may use a minimum number of unmanned automated transport vehicles by considering the entire process flow and dispatching the vehicles to assembly stations that either have availability or will become available soon, and the process may batch certain operations together.

In one variation, which may be combined with or separate from the other variations described herein, a method of assembling a manufactured item without a guide rail is provided. The method includes disposing a base item on an unmanned independent vehicle system. The method further includes moving the unmanned independent vehicle system to an assembly station and attaching an additional item to the base item, resulting in an intermediate assembled item.

In another variation, which may be combined with or separate from the other variations described herein, an assembly system for assembling a plurality of manufactured items without a guide rail is provided. The assembly system includes a number of unmanned independent vehicle systems, each unmanned independent vehicle system having at least one wheel. Each unmanned independent vehicle system is configured to be loaded with a base item. The assembly system also has a number of assembly stations, each being configured to complete at least one assembly operation. Each unmanned independent vehicle system is configured to independently move to multiple of the assembly stations to have a different assembly operation performed at each assembly station resulting in a plurality of additional items being attached to each base item to form each manufactured item.

Additional features may be provided, including but not limited to the following: the unmanned independent vehicle system including one or more of the following: an automated guided vehicle (AGV), an automated guided cart (AGC), a laser guided vehicle (LGV), a vision guided vehicle (VGV), an autonomous vehicle, and a drone. In some cases, the unmanned independent vehicle system has one or more wheels.

Further additional features may be provided, including but not limited to the following: wherein attaching the additional item to the base item includes welding the additional item to the base item in the assembly station with a number of spot welds; wherein welding the additional item to the base item has no predetermined cycle time; wherein welding the additional item to the base item is configured to last as long as needed to complete the spot welds so that additional spot welds are not needed to secure the additional item to the base item; moving the unmanned independent vehicle system to a second assembly station; attaching a second additional item to the intermediate assembled item; wherein the welding is performed by at least one robot; disposing a loading station for placing the base item on the independent unmanned vehicle system in a location outside of an area of reach of the robot; determining a desired number of unmanned independent vehicle systems for a particular set of operations based on a travel time and a cycle time for each operation and based on a number of buffer parts; providing the desired number of unmanned independent vehicle systems; determining whether an assembly station is available and tooled for a desired operation; if an assembly station is not available and tooled for the desired operation, determining whether any assembly station is tooled for the desired operation (even if currently unavailable); if an assembly station is tooled for the desired operation, waiting for the assembly station that is tooled for the desired operation to become available and when the assembly station that is tooled for the desired operation becomes available, moving an unmanned independent vehicle system to the assembly station that is tooled for the desired operation; if no assembly station is tooled for the desired operation, waiting for an assembly station having a shortest wait time to complete a current operation, retooling the assembly station having the shortest wait time after the assembly station having the shortest wait time completes the current operation, and moving the unmanned independent vehicle system to that assembly station; determining a desired style penetration ratio; monitoring an actual style penetration ratio; determining a difference between the actual style penetration ratio and the desired style penetration ratio; loading the base item having a style that will bring the actual style penetration ratio toward conformance with the desired style penetration ratio; and performing various operations above with a control system.

Further aspects, advantages and areas of applicability will become apparent from the description provided herein. It should be understood that the description and specific examples and drawings are intended for purposes of illustration only and are not intended to limit the scope of the present disclosure.

DETAILED DESCRIPTION

Figure 1:
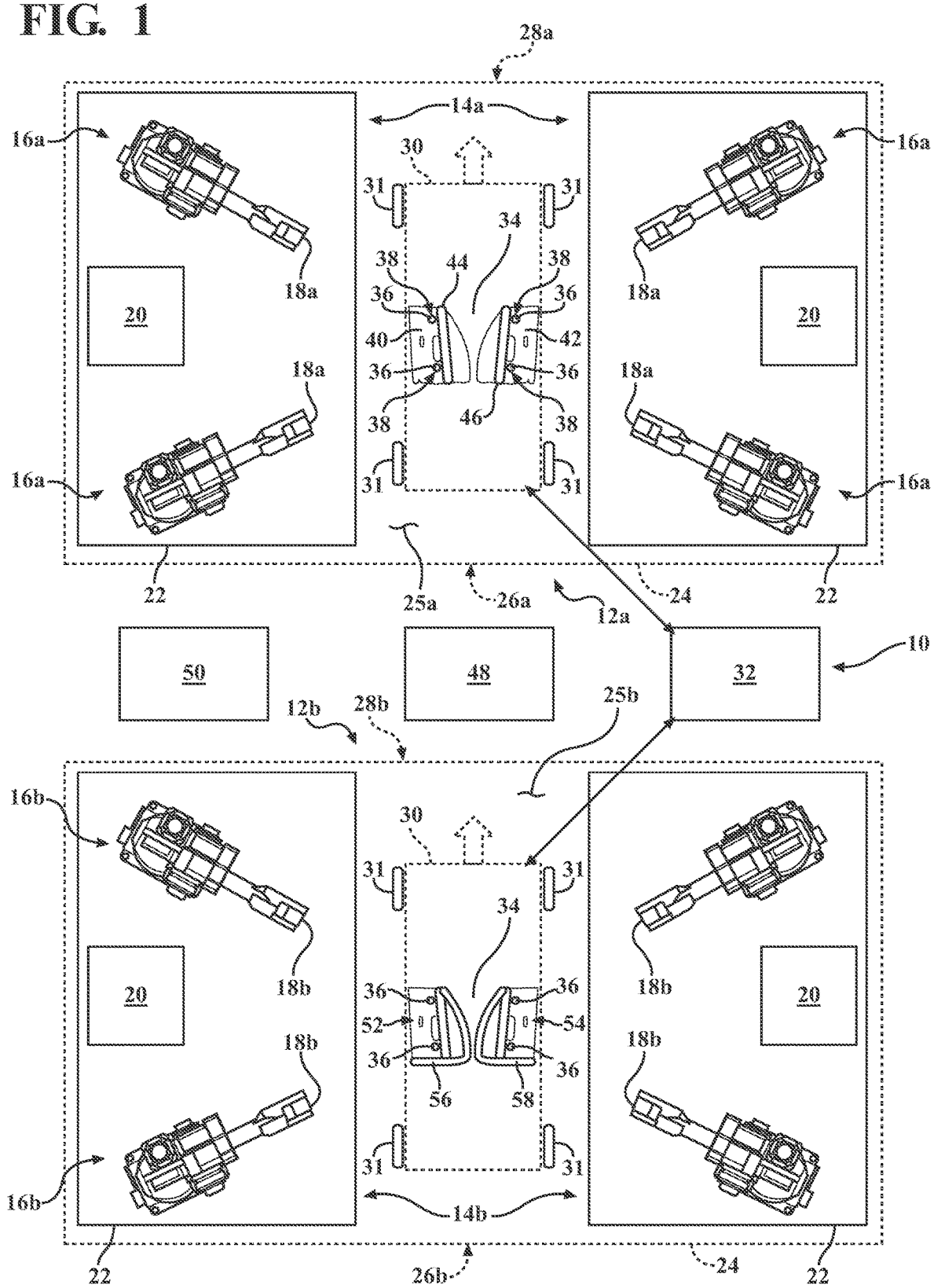
FIG. 1 is a schematic plan view of an example assembly system for assembling manufactured items, in accordance with the principles of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified schematic form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

The present disclosure provides a system and method that perform assembly operations using an unmanned independent vehicle system to transport partially-assembled parts from one assembly operation to another to be further added to or built upon.

For example, referring now to FIG. 1, a schematic representation of an assembly system for assembling a number of manufactured items without a guide rail is illustrated and generally designated at 10. The assembly system 10 includes a plurality of assembly stations 12a, 12b, each of the assembly stations 12a, 12b being configured to complete at least one assembly operation. For purposes of illustration, the assembly stations 12a, 12b are shown in close proximity to each other due to limited paper space, but it should be understood that the assembly stations 12a, 12b could be located any desirable distance from each other. Furthermore, although only two assembly stations 12a, 12b are shown, additional assembly stations may also be included.

In the illustrated example, each assembly station 12a, 12b is a welding station configured to perform spot welding. Each assembly station 12a, 12b, in this example, includes two substations 14a, 14b. In this example, each substation 14a, 14b has two welding robots 16a, 16b.

The welding robots 16a in the first assembly station 14a are configured to perform a first assembly operation on a part, which will be described in further detail below. To this end, each welding robot 16a in the first assembly station 14a has a welding tool 18a (or set of welding tools 18a) designed to perform the first assembly operation.

Similarly, the welding robots 16b in the second assembly station 14b are configured to perform a second assembly operation on a part, which will be described in further detail below. To this end, each welding robot 16b in the second assembly station 14b has a welding tool 18b (or set of welding tools 18b) designed to perform the second assembly operation. The welding tools 18b used in the second assembly operation at the second assembly station 12b may be different than the welding tools 18a used in the first assembly operation at the first assembly station 12a. A tool changer 20 may be disposed in each substation 14a, 14b to change the welding tools 18a, 18b of the robots 16a, 16b when a different welding operation is to be performed. For example, the first welding station 12a may be capable of performing the second welding operation, or a third, fourth, or fifth welding operation, if the tool 18a is changed.

Each substation 14a, 14b has a barrier, such as a fence 22, surrounding the welding robots 16a, 16b to prevent a person from becoming injured by the robots 16a, 16b, and secondarily, to prevent the robots 16a, 16b from becoming damaged. Another barrier, which may be of another type, such as a light curtain 24, may surround the entire first assembly station 12a including both substations 14a and the operation area 25a; and similarly, a barrier, such as a light curtain 24 may surround the entire second assembly station 12b including both substations 14b and the operation area 25b. In the alternative, each second barrier 24 may be implemented so that the second barriers 24 do not surround the entire assembly stations 12a, 12b, but instead, the second barrier 24 may be disposed only at the entrances 26a, 26b and exits 28a, 28b to the operation areas 25a, 25b of the assembly stations 12, 12b.

A plurality of unmanned independent vehicle systems 30 are used to move parts around within the manufacturing plant to be assembled with other parts at the assembly stations 12a, 12b. Although only two assembly stations 12a, 12b are illustrated in FIG. 1, it should be understood that any desired number of assembly stations 12a, 12b may be used. In some settings, as many as hundreds of different assembly stations could be used, each being configured to perform a different operation on the parts being moved therethrough.

Each unmanned independent vehicle system 30 may be a vehicle that has one or more wheels 31 and moves into and around the assembly stations 12a, 12b, including into the operation areas 25a, 25b. The wheels 31 extend from the unmanned independent vehicle system 30 to engage a ground surface (e.g., a plant or facility floor). The wheels 31 may be any size, shape, or configuration that is convenient, and may in some examples be omnidirectional in order to provide forward and reverse motion, crabbing, and rotational movement capabilities with respect to a ground surface in order to assist in maneuvering techniques used by the unmanned independent vehicle system 30. Alternatively, one or more, or even all, of the wheels 31 may be standard wheels or casters, crawler tracks, or a conveyor system. In another alternative, an unmanned independent vehicle system 30 may be a drone having no wheels in operation when the drone is flying the parts around the plant.

Each unmanned independent vehicle system 30 may include one or more of the following: an automated guided vehicle (AGV), an automated guided cart (AGC), a laser guided vehicle (LGV), a vision guided vehicle (VGV), an autonomous vehicle (AV), any other wheeled vehicle, and/or a drone. In some examples, each unmanned independent vehicle system 30 includes an unmanned and self-propelled robotic vehicle that is used to transport a part along a route that can be either pre-defined or determined in real-time by the unmanned independent vehicle system 30 itself. The unmanned independent vehicle system 30 may utilize one or more controllers, optical sensors, distance sensors, global positioning system(s) (GPS), and/or laser guidance for navigation, by way of example. The navigation system can dictate a precise path for the unmanned independent vehicle system 30 to travel and provide real-time path adjustments for anything that encroaches upon the travel path of the unmanned independent vehicle system 30.

In some examples, each unmanned independent vehicle system 30 may generally be autonomous in its navigation of a route or segment to a destination, in contrast to a defined or dedicated path. Moreover, in some example, an unmanned independent vehicle system 30 may include a swarm of individual transport vehicles, such as those described in U.S. patent application Ser. No. 16/124,329, filed on Sep. 7, 2018, which is hereby incorporated by reference in its entirety. As described in the Ser. No. 16/124,329 patent application, each unmanned independent vehicle system 30 may include a number of autonomous robotic transports, where each is a mobile robot that does not need external guidance, e.g., by way of markers or wires in the floor. The unmanned independent vehicle systems may thus be self-navigated using LIDAR, RADAR, cameras or other visual navigation devices facilitating three-dimensional vision, ultrasonic sensors, or the like. In the alternative, however, each unmanned independent vehicle system 30 may include one or more AGCs or AGVs that do follow a predetermined route and/or markers or wires in the floor.

The system 10 may further include a facility controller 32, which may generally assign tasks to the unmanned independent vehicle system 30 as needed. Thus, the control system 32 may analyze tasks, designate one or more AGCs, AGVs, LGVs, or AVs as being included in a swarm for carrying out a given task as an unmanned independent vehicle system 30, and may also generate one or more routes the unmanned independent vehicle system 30. The control system 32 may thus be in communication with each unmanned independent vehicle system 30 and with each individual vehicle thereof if a swarm is used to form the unmanned independent vehicle system. The route may, in turn, be divided into a plurality of segments between various assembly stations 12a, 12b, which collectively make up the route. The unmanned independent vehicle systems 30, however, may be autonomous in some examples, so that even if an obstacle is located within its predetermined route, the unmanned independent vehicle system 30 may be able to navigate around the obstacle to travel to its destination.

Each unmanned independent vehicle system 30 may include at least one locator, such as a geostationary locator, to locate the part in a precise desired position and orientation on the unmanned independent vehicle system 30. In this case, the locator is in the form of a plurality of pins 36 extending a predetermined distance above a top surface 34 of the unmanned independent vehicle system 30. Each locator 36 arranged on the unmanned independent vehicle system 30 may engage with a part at a predetermined datum location relative to the body of the unmanned independent vehicle system 30. For example, the locator pins 36 may extend into locator holes 38 within the part such that positioning of the part may be maintained during assembly and/or manufacturing operations and when the part is being transported around the plant by the unmanned independent vehicle system 30. Each locator pin 36 may be fixedly secured to the top surface 34 of the unmanned independent vehicle system 30 or may be movably arranged thereon. Moreover, the locator pin 36 may interface with an intermediate fixture(s) as needed for handling a part.

A robot or human material handler (not shown) may place parts upon an unmanned independent vehicle system 30. For example, a part may be placed upon a standardized fixture (not shown), on the locating pins 36, or the unmanned independent vehicle systems 30 themselves may have an end effector or other movable fixture(s) for clamping and/or carrying parts to the unmanned independent vehicle system 30.

The unmanned independent vehicle system 30 may also house one or more on-board controllers for controlling movement of the unmanned independent vehicle system 30, clamping onto a part, or maintaining a swarm that makes up the unmanned independent vehicle system 30, by way of example. The on-board controller may employ distributed robotics technologies, e.g., which provide the ability for an on-board controller on one individual vehicle of the unmanned independent vehicle system 30 to behave as a master controller communicating with slave controllers arranged on the other vehicles of the unmanned independent vehicle system 30 when a swarm is used; and on-board controllers may also serve as master controllers communicating with other master controllers from other unmanned independent vehicle systems 30 moving through the manufacturing facility. Communication with other unmanned independent vehicle system 30 may allow each of the unmanned independent vehicle system 30 to modify its route based on priorities when an obstacle is present on a normal route. When a swarm of individual vehicles makes up the unmanned independent vehicle system 30, all on-board controllers may have the same computing capability, but preferably only one is assigned as the master controller in the unmanned independent vehicle system 30 at any particular time.

As an alternative to the distributed robotics technology system described above, however, it should be understood that a centralized system may also be used for controlling movement of the unmanned independent vehicle system 30. In the centralized system, all unmanned independent vehicle system 30 communicate with a central controller, e.g., control system 32, which in turn may determine traffic, conflict, malfunctions, etc. and relays appropriate control maneuvers to each unmanned independent vehicle system 30.

Each unmanned independent vehicle system 30 may also have one or more outwardly directed sensors configured to assist with navigation of the unmanned independent vehicle system 30. Merely as examples, the unmanned independent vehicle system 30 may have a plurality of distance sensors at the front, side, and/or rear of the unmanned independent vehicle system 30, respectively. One or more cameras or optical sensors may also be provided. The unmanned independent vehicle system 30 may be powered by any mechanism that is convenient. Merely as one example, the unmanned independent vehicle system 30 may have an electric motor configured to drive one or more of the wheels 31, with the motor receiving power from a battery pack.

Each unmanned independent vehicle system 30 is configured to be loaded with at least one base item, which is a manufactured part upon which additional parts will be assembled at the assembly stations 12a, 12b (and any additional assembly stations). In the example shown in FIG. 1, an unmanned independent vehicle system 30 is located within the operation area 25a of the first assembly station 12a and has two base items 40, 42 disposed thereon, each of which are a base part of a vehicle door. Each of the base items 40, 42 may be held in place on the unmanned independent vehicle systems 30 with the locating pins 36 and/or with one or more clamps. At least one additional part 44, 46 is also secured to each base item 40, 42 to be assembled to the base item 40, 42 in the operation area 25a of the first assembly station 12a. In this case, an inner panel reinforcement part is the additional part 44, 46 that is welded to each door 40, 42 during the welding operation that is performed in the assembly area 25a of the first assembly station 12a.

The unmanned independent vehicle systems 30 has entered the operation area 25a of the first assembly station 12a through the entrance 14a. The entrance 14a may include a light curtain and/or other alarm barrier 24 that allows the unmanned independent vehicle systems 30 to pass by the barrier 24, but disables the robots 16a in the first assembly station 12a if a person or another object enters past the barrier 24 of the first assembly station 12a. When the loaded unmanned independent vehicle system 30 is located in the operation area 25a within the first assembly station 12a, as shown in FIG. 1, the welding robots 16a perform a first assembly operation to assemble the additional parts 44, 46 to each base part 40, 42, respectively, to form an intermediate assembled item or part that includes the additional parts 44, 46 welded to the base parts 40, 42.

The robots 16a attach each additional part 44, 46 to the base parts 40, 42, respectively, through a plurality of spot welds. In this example, the welding operation performed in the first assembly station 12a has no predetermined cycle time, and the welding operation is configured to last for as long as needed to complete the plurality of spot welds so that additional spot welds are not needed to secure each additional item 44, 46 to its respective base item 40, 42.

Each unmanned independent vehicle system 30 is configured to independently move to multiple of the assembly stations 12a, 12b to have a different assembly operation performed at each assembly station 12a, 12b, resulting in a plurality of additional items being attached to each base item 40, 42 to form each manufactured item. Thus, when the welding operation performed in the first assembly station 12a is complete, the unmanned independent vehicle system 30 leaves the first assembly station 12a, for example, via the exit 28a. The unmanned independent vehicle system 30 may then travel to a loading station 48. In the loading station 48, a human operator or robot may unload the intermediate assembled part from the unmanned independent vehicle system 30 and store it, for example, in a part storage or buffer area 50, or the human operator or robot may add a further additional item or items to the intermediate assembled item to be assembled to the intermediate assembled part. If the intermediate assembled item is unloaded and stored, an intermediate assembled item is eventually placed on an unmanned independent vehicle system 30 and sent to the second assembly station 12b. In other variations, the unmanned independent vehicle system 30 need not travel to the loading station 48, and instead, the unmanned independent vehicle system 30 could travel directly from the first assembly station 12a to the second assembly station 12b to assemble further additional items to the partially assembled item. In such a case, the further additional items could be stored at the second assembly station 12b and could be placed onto the intermediate assembled items 52, 54 (labeled in station 12b) via robot loading devices.

When the unmanned independent vehicle system 30 has entered the second assembly station 12b and stopped in the operation area 25b, further additional items 56, 58 may be welded to the intermediate assembled items 52, 54, respectively, via the robots 16b of the second assembly station 12b. The welding robots 16b perform a number of spot welds to assemble each additional part 56, 58 to each partially assembled door 52, 54. After the welding operation is complete in the second welding station 12b, the unmanned independent vehicle system 30 may proceed back to the loading station 48 or another loading station, or to another assembly station to be further built upon or assembled to another item, such as to a vehicle body or frame.

In addition to unloading partially completed parts at the loading station 48, the loading station 48 (or another loading station) may be configured to dispose each base item 40, 42 onto an independent unmanned vehicle system 30. The loading station 48 is located outside of an area of reach of the robots 16a, 16b. The system 10 described herein makes it possible to dispose the loading station 48 away from the reach of the robots 16a, 16b because the unmanned independent vehicle system 30 is able to move the parts into the vicinity of the welding robots 16a, 16b after the parts are loaded onto the unmanned independent vehicle system(s) 30.

Generally, the control system 32 may be a facility or plant-level controller having responsibility for a facility or area within the facility, which facilitates development and assignment of material handling tasks. In one example, the control system 32 is configured to determine a desired number of unmanned independent vehicle systems 30 desired or needed for performing the assembly operations based on travel times of each unmanned independent vehicle system 30 to each assembly station 12a, 12b and to the loading station 48, cycle times for each assembly operation, and a desired or existing number of buffer parts to be stored. Thus, the desired number of unmanned independent vehicle systems 30 can be represented as follows:

$$\#\text{vehicle systems} = f(\text{travel time}, \text{cycle time}, \text{buffer parts}) \quad (1)$$

In a more specific example, an intermediate value K represents the ceiling of the ratio between travel time and cycle time as follows:

$$K = \text{ceiling}\left(\frac{\text{travel time}}{\text{cycle time}}\right) \quad (2)$$

In this case, the number of unmanned independent vehicle systems 30 desired can further be determined based on the number of assembly stations, as follows:

$$\#\text{ vehicle systems} = \#\text{ assembly stations} + \text{ceiling}\left(\frac{(\text{total buffers} + K)}{2}\right) \quad (3)$$

Figure 2:
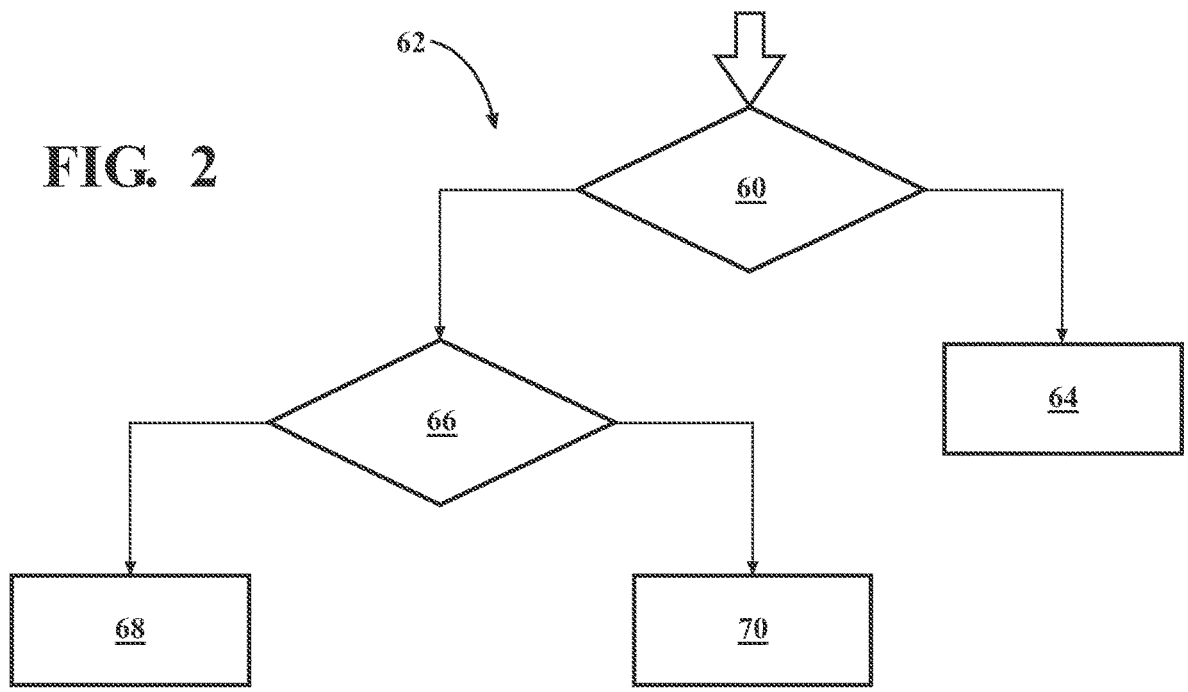
FIG. 2 is a block diagram illustrating a method for minimizing the number of unmanned independent vehicle systems that satisfy nonstop closed-loop operations, according to the principles of the present disclosure.
Figure 4:
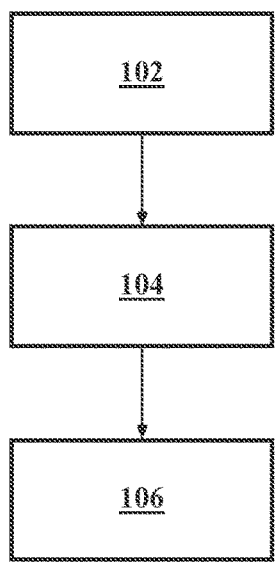
FIG. 4 is a block diagram illustrating a method of assembling a manufactured item without a guide rail, in accordance with the principles of the present disclosure.

Referring now to FIG. 2, with continued reference to FIG. 1, the control system 32 may be further configured to perform a method 62 for minimizing a number of unmanned independent vehicle systems 30 that satisfy nonstop closed-loop operations. Thus, the control system 32 is configured to determine whether an assembly station 12a, 12b is available and tooled for a desired assembly operation, in step 60 of the method 62 that may be implemented by the control system 32. If so, the control system 32 is configured to implement step 64 by causing an unmanned independent vehicle system 30 bearing the part or parts to be assembled to travel to the welding station 12a, 12b that has an available robot 16a, 16b which is tooled to complete the desired operation.

If an assembly station 12a, 12b is not available and tooled for the desired assembly operation, the control system 32 may be configured to determine, in step 66, whether any occupied assembly station 12, 12b is tooled for the desired operation. If, indeed, there is an occupied assembly station 12a, 12b tooled for the desired operation, the control system 32 (whether centrally located or on-board an unmanned independent vehicle system 30) causes the unmanned independent vehicle system 30 to wait for the assembly station 12a, 12b that is tooled for the desired operation to become available and when the assembly station 12a, 12b that is tooled for the desired operation becomes available, the control system 32 causes an unmanned independent vehicle system 30 bearing a part for which the desired assembly operation is desired to move to the assembly station 12a, 12b that is tooled for the desired operation, in step 68. If more than one assembly station 12a, 12b is tooled for the desired operation, the control system 32 chooses the one with the shortest wait time and causes the unmanned independent vehicle system 30 to be sent thereto.

If, however, there is no assembly station tooled for the desired operation, the control system 32 is configured, in step 70, to cause an unmanned independent vehicle system 30 to wait for whichever assembly station 12a, 12b has a shortest wait time to complete a current operation. (If the wait times are equal, the control system 32 may choose either assembly station 12a, 12b). The control system 32 causes the unmanned independent vehicle system 30 to move to the assembly station 12, 12b that has the shortest wait time to complete the current operation, and the control system 32 may cause the robots 16a, 16b at the selected assembly station 12a, 12b to retool for the desired operation after the assembly station having the shortest wait time completes the current operation. The robots 16a, 16b of the selected station then retool from the tool changer 20.

The control system 32 may be further configured to determine a desired style penetration ratio. A style penetration ratio is a desired ratio of different styles that are to be built in the plant. For example, there may be three styles to be built using the assembly stations 12a, 12b (and/or additional assembly stations), and in one example, the desired style penetration ration could be 3:3:2, so that the first two styles should have the same number of parts built, and the third style should have ⅓ less parts built. The control system 32 would then monitor an actual style penetration ratio, which may be done periodically, such as, for example, every four hours. The control system 32 may then determine a difference between the actual style penetration ratio and the desired style penetration ratio. The control system 32 may then cause a base item to be loaded onto an unmanned independent vehicle system 30 for whichever style that will bring the actual style penetration ratio toward conformance with the desired style penetration ratio.

Figure 3:
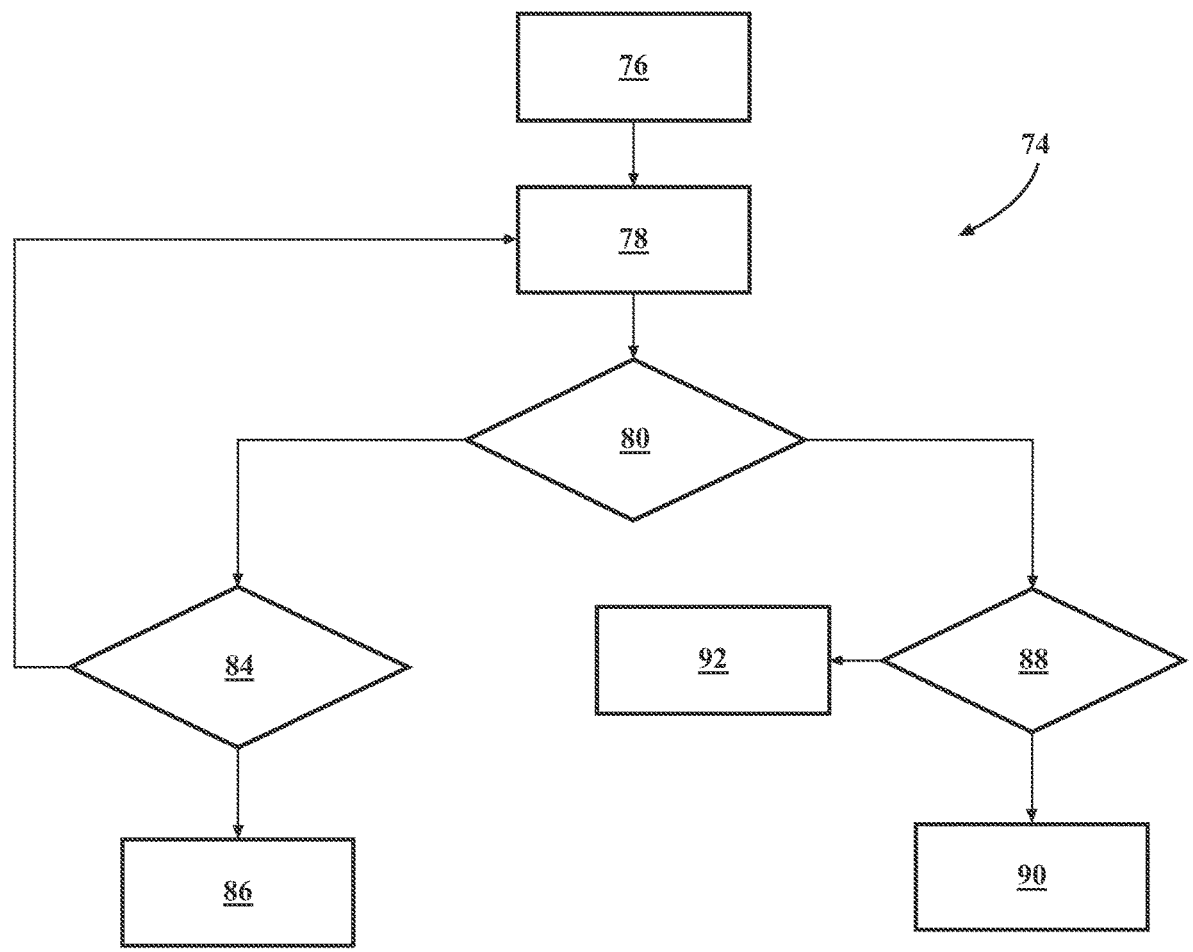
FIG. 3 is a block diagram illustrating a method for loading control using unmanned independent vehicle systems, in accordance with the principles of the present disclosure.

Referring now to FIG. 3, with continued reference to FIG. 1, an example of a method for loading control is illustrated and generally designated at 74. The method 74 may be implemented by the controller 32 or an on-board controller of an unmanned independent vehicle system 30, by way of example. The method 74 includes a starting step 76 of loading parts for a first operation onto an unmanned independent vehicle system 30. This may include, for example, locating the base item(s) 40, 42 onto the unmanned independent vehicle system 30 with the locating pins 36 each and clamping or placing each additional item(s) 44 onto each base item 40, 42 to be attached or welded together in the first operation. The base parts 40, 42 and additional parts 44 are selected based on the desired style, for example, as explained above. The method 74 then includes a step 78 of performing the first assembly operation.

After the first assembly operation is complete, the method 74 includes determining, in step 80, whether the unmanned independent vehicle system 30 leaving the first operation has a part that is attached together as performed in the first assembly operation 12a. If not, this means that something went wrong—either the first assembly operation did not actually take place or it was inadequate and a repair is needed. The method 74 may include, in step 84, making a determination of whether the unmanned independent vehicle system 30 should return to step 78 to perform the first assembly operation, or whether the part needs further repair or to be scrapped, in which case, the method 74 includes in step 86 unloading the inadequate part and reloading the unmanned independent vehicle system 30 with a part or parts that either has the first assembly operation complete or needs the first assembly operation to take place next.

In step 80, if it is determined that the first assembly operation is complete, the method 74 proceeds to a step 88 to determine whether all operations for the manufactured item are complete. If not, the method 74 proceeds to step 90 to load for the next assembly operation in the sequence. If all operations are complete, however, the method 74 proceeds to step 92 to unload the completed manufactured part or sub-part, and the next base part is then loaded to assemble another part in accordance with the desired style penetration ratio.

The present disclosure contemplates that controllers may perform a method 100 of assembling a manufactured item without a guide rail, as follows, and using similar parts and systems as those described above. For example, the method 100 may include a step 102 of disposing a base item on an unmanned independent vehicle system, the unmanned independent vehicle system having at least one wheel. The method 100 may further include a sequential step 104, that occurs after step 102, of moving the unmanned independent vehicle system to an assembly station, along with the base item that is disposed on the unmanned independent vehicle system. The method 100 may include another sequential step 106, that occurs after step 104, of attaching an additional item to the base item, resulting in an intermediate assembled item.

As described above with respect to the system 10, the method 100 may include one or more additional steps, such as the following: moving the unmanned independent vehicle system to a second assembly station; attaching a second additional item to the intermediate assembled item; determining a desired number of unmanned independent vehicle systems for a particular set of operations based on a travel time and a cycle time for each operation and based on a number of buffer parts; and providing the desired number of unmanned independent vehicle systems.

The system 10, as described herein, may be beneficial for use in the automotive and aerospace manufacturing industries; the pulp and metal processing industries; the agricultural, military, appliance, construction, food and beverage, consumer products and medical service industries; and general manufacturing applications, merely as examples.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An assembly system for assembling a plurality of manufactured items without a guide rail, the assembly system comprising:
    a plurality of unmanned independent vehicle systems, each unmanned independent vehicle system being configured to be loaded with a base item, wherein the plurality of unmanned independent vehicle systems corresponds to a desired number of unmanned independent vehicle systems;
    a plurality of assembly stations, each being configured to complete at least one assembly operation; and
    a control system in communication with each unmanned independent vehicle system of the plurality of unmanned independent vehicle systems,
    wherein each unmanned independent vehicle system is configured to independently move to multiple of the assembly stations to have a different assembly operation performed at each assembly station resulting in a plurality of additional items being attached to each base item to form each manufactured item,
    wherein the control system is configured to determine the desired number of unmanned independent vehicle systems for performing the assembly operations based on:
        travel times of each unmanned independent vehicle system to each assembly station;
        cycle times for each assembly operation; and
        a number of buffer parts.

2. The assembly system of claim 1, each unmanned independent vehicle system including one or more of the following: an automated guided vehicle (AGV), an automated guided cart (AGC), a laser guided vehicle (LGV), a vision guided vehicle (VGV), an autonomous vehicle, a drone, and a wheeled vehicle having at least one wheel.

3. The assembly system of claim 2, wherein at least one assembly station is configured to perform a welding operation to attach an additional item to a base item, the welding operation including performing a plurality of spot welds.

4. The assembly system of claim 3, wherein welding operation has no predetermined cycle time, the welding operation being configured to last for as long as needed to complete the plurality of spot welds so that additional spot welds are not needed to secure the additional item to the base item.

5. The assembly system of claim 3, wherein a first assembly station is configured to weld a first additional item to the base item to form an intermediate item, and a second assembly station is configured to weld a second additional item to the intermediate item.

6. The assembly system of claim 5, wherein the control system is further configured to:
    determine a desired style penetration ratio;
    monitor an actual style penetration ratio; determine a difference between the actual style penetration ratio and the desired style penetration ratio; and
    load onto an unmanned independent vehicle system a base item having a style that will bring the actual style penetration ratio toward conformance with the desired style penetration ratio.

7. The assembly system of claim 3, wherein the at least one assembly station includes at least one robot configured to perform the welding operation, the assembly system further comprising a loading station configured to dispose each base item onto an independent unmanned vehicle system in a location outside of an area of reach of the at least one robot.

8. The assembly system of claim 7, wherein the at least one robot is disposed within an operation area, the operation area including a barrier that allows passage of at least one unmanned independent vehicle system of the plurality of unmanned independent vehicle systems, wherein the at least one robot is disabled when an object other than the at least one unmanned independent vehicle system passes the barrier.

9. The assembly system of claim 8, wherein the barrier comprises a light curtain.

10. The assembly system of claim 1, wherein the control system is further configured to:
   determine whether an assembly station is available and tooled for a desired assembly operation;
   if an assembly station is not available and tooled for the desired assembly operation, determine whether an assembly station is tooled for the desired operation;
   if an assembly station is tooled for the desired operation, wait for the assembly station that is tooled for the desired operation to become available and when the assembly station that is tooled for the desired operation becomes available, cause an unmanned independent vehicle system bearing a part for which the desired assembly operation is desired to move to the assembly station that is tooled for the desired operation.

11. The assembly system of claim 10, the control system being further configured to cause components of the assembly system to perform the following if no assembly station is tooled for the desired operation:
   wait for an assembly station that has a shortest wait time to complete a current operation;
   move the unmanned independent vehicle system to the assembly station that has the shortest wait time to complete the current operation; and
   retool the assembly station having the shortest wait after the assembly station having the shortest wait time completes the current operation.

* * * * *